United States Patent
Girdlestone et al.

(10) Patent No.: US 7,951,346 B2
(45) Date of Patent: May 31, 2011

(54) METHODS AND SYSTEMS FOR REDUCING PARTICULATE MATTER IN A GASEOUS STREAM

(75) Inventors: Tom Girdlestone, Knoxville, TN (US); Steven De Cicco, Knoxville, TN (US); William S. Epling, Waterloo (CA); Jerald A. Cole, Long Beach, CA (US); Gregory J. Wagner, Knoxville, TN (US)

(73) Assignee: Emerachem, LLC, Knoxville, TN (US)

( * ) Notice: Subject to any disclaimer, the term of this patent is extended or adjusted under 35 U.S.C. 154(b) by 0 days.

(21) Appl. No.: 12/610,067

(22) Filed: Oct. 30, 2009
(Under 37 CFR 1.47)

(65) Prior Publication Data
US 2010/0196241 A1    Aug. 5, 2010

Related U.S. Application Data

(60) Provisional application No. 61/110,482, filed on Oct. 31, 2008.

(51) Int. Cl.
*B01D 46/00* (2006.01)
*B01D 53/34* (2006.01)
*B01D 53/50* (2006.01)
*B01D 53/72* (2006.01)
*B01D 53/86* (2006.01)
*B01D 53/94* (2006.01)
*F01N 3/10* (2006.01)

(52) U.S. Cl. ............... 423/210; 423/215.5; 423/244.01; 423/244.09; 423/244.1; 423/245.3; 422/168; 422/169; 422/170; 422/171; 422/177; 422/178; 422/180; 422/181; 422/213; 55/482; 55/524; 55/DIG. 30; 60/311

(58) Field of Classification Search ................ 423/210, 423/215.5, 244.01, 244.09, 244.1, 245.3; 422/168–171, 177, 178, 180, 181, 213; 55/482, 55/524, DIG. 30; 60/311
See application file for complete search history.

(56) References Cited

U.S. PATENT DOCUMENTS

| | | | |
|---|---|---|---|
| 5,052,178 A | 10/1991 | Clerc et al. | |
| 5,203,166 A | 4/1993 | Miller | |
| 5,397,550 A * | 3/1995 | Marino, Jr. ............ | 422/178 |
| 5,451,558 A | 9/1995 | Campbell et al. | |
| 5,599,758 A | 2/1997 | Guth et al. | |
| 5,607,650 A | 3/1997 | Debbage et al. | |
| 5,650,127 A | 7/1997 | Campbell et al. | |
| 5,665,321 A | 9/1997 | Campbell et al. | |
| 5,762,885 A | 6/1998 | Debbage et al. | |
| 5,874,057 A | 2/1999 | Deeba et al. | |
| 5,953,911 A | 9/1999 | Guth et al. | |
| 6,037,307 A | 3/2000 | Campbell et al. | |
| 6,051,040 A * | 4/2000 | Peter-Hoblyn ......... | 44/358 |
| 6,251,347 B1 | 6/2001 | Campbell et al. | |
| 6,479,022 B1 | 11/2002 | Campbell et al. | |
| 6,521,196 B2 | 2/2003 | Campbell et al. | |

(Continued)

*Primary Examiner* — Timothy C Vanoy
(74) *Attorney, Agent, or Firm* — Rudy J. Ng; Bozicevic, Field & Francis LLP

(57) ABSTRACT

Methods and systems for reducing emissions of particulate matter from a gaseous stream are provided. The subject systems include a catalyst that reduces the amount of particulate matter emissions in the gaseous stream. Embodiments of the subject systems may also reduce the amount of particulate matter precursor emissions in the gaseous stream. In some cases, the subject systems and methods include a sorber that facilitates the reduction in particulate matter and particulate matter precursors in the gaseous stream. The subject methods and systems find use in a variety of applications where it is desired to reduce particulate matter emissions from a gaseous stream.

65 Claims, 3 Drawing Sheets

U.S. PATENT DOCUMENTS

| | | | |
|---|---|---|---|
| 7,189,375 B2 * | 3/2007 | Molinier et al. | 422/171 |
| 7,235,220 B2 | 6/2007 | Honjo et al. | |
| 2002/0048542 A1 * | 4/2002 | Deeba et al. | 423/239.1 |
| 2006/0270548 A1 * | 11/2006 | Pfeifer et al. | 502/300 |
| 2009/0155525 A1 * | 6/2009 | Li | 428/116 |

* cited by examiner

METHODS AND SYSTEMS FOR REDUCING PARTICULATE MATTER IN A GASEOUS STREAM

CROSS-REFERENCE TO RELATED APPLICATION

This application claims the benefit of U.S. Provisional Patent Application No. 61/110,482, filed Oct. 31, 2008, which application is incorporated herein by reference in its entirety.

INTRODUCTION

Particulate matter is small particles of solid or liquid suspended in a gas and can occur in primary or secondary forms. Primary particulate matter is particles released directly into the atmosphere, such as hydrocarbons, smoke, dust, and the like. Secondary particulate matter, or particulate matter precursors, is emissions (such as $NO_x$, sulfur, ammonia, and the like) that react with other pollutants to form particulate matter. Activities such as burning fossil fuels in vehicles, power plants and various industrial processes generates significant amounts of particulate matter and particulate matter precursors. Emissions of particulate matter less than 10 µm in diameter (e.g. $PM_{10}$), such as so-called fine particles (e.g., particulate matter less than 2.5 µm in diameter, $PM_{2.5}$, or less than 1 µm in diameter, $PM_1$) and ultrafine particles (UFP or UP; e.g., particulate matter less than 0.1 µm in diameter), may pose a health concern because they can be inhaled into and accumulate in the respiratory system. Inhalation of particulate matter is linked to health hazards such as heart disease, altered lung function, and lung cancer. Thus, there is continued interest in the development of systems for the reduction of particulate matter and particulate matter precursors in gaseous streams, such as combustion gas streams from reciprocating internal combustion engines, internal combust turbines, utility boilers, industrial boilers, and the like.

SUMMARY

Methods and systems for reducing emissions of particulate matter from a gaseous stream by are provided. The subject methods and systems include a catalyst that reduces the amount of particulate matter in the gaseous stream. Embodiments of the subject systems may also reduce the amount of particulate matter precursor emissions in the gaseous stream. In some cases, the subject systems and methods include a sorber that facilitates the reduction in particulate matter and particulate matter precursors in the gaseous stream. The subject methods and systems find use in a variety of applications where it is desired to reduce particulate matter emissions from a gaseous stream.

DETAILED DESCRIPTION

Figure 1:
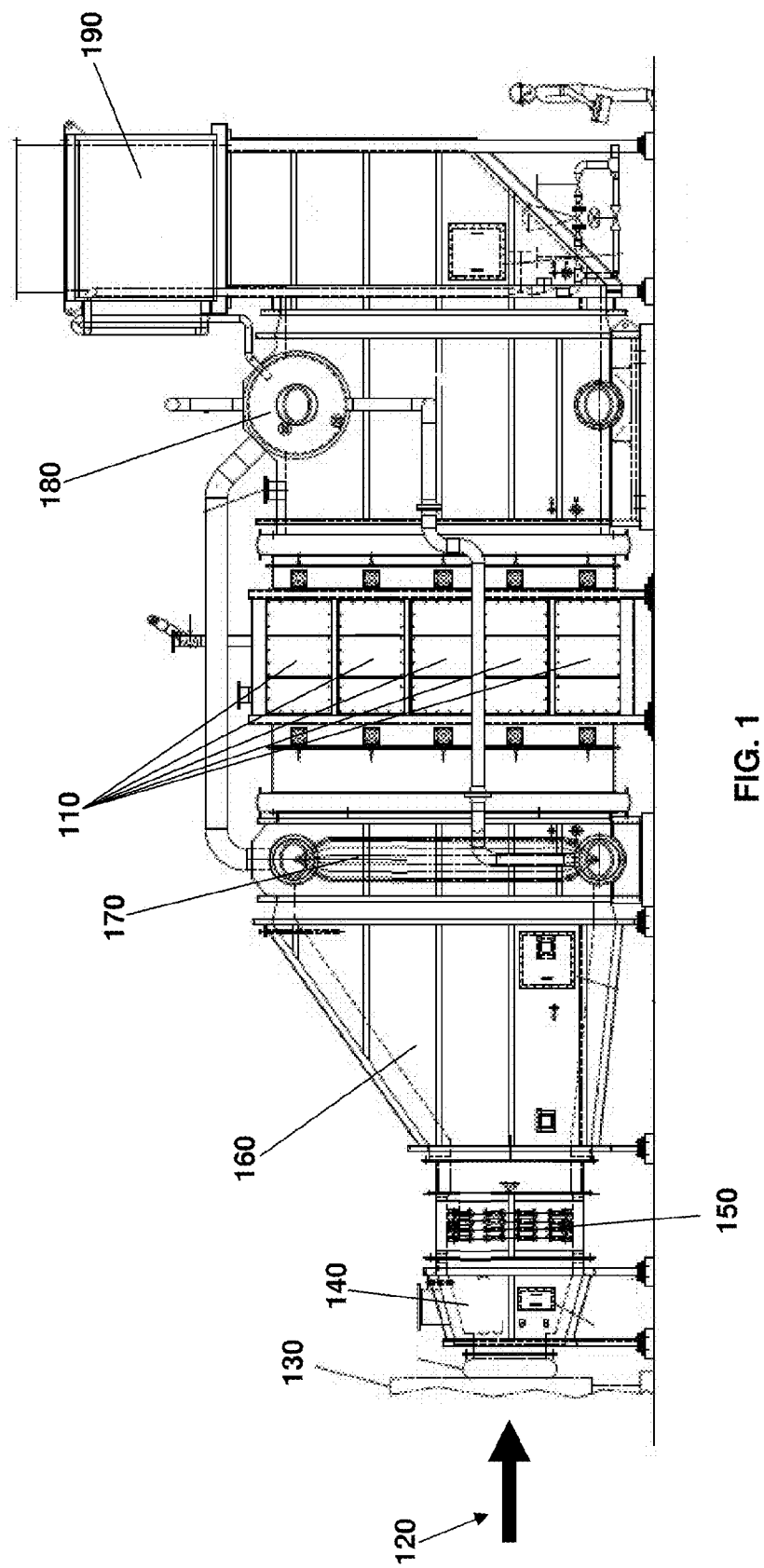
FIG. 1 shows a schematic of an embodiment of a subject system for reducing emissions of particulate matter from a gaseous stream.

Methods and systems for reducing emissions of particulate matter from a gaseous stream are provided. The subject systems include a catalyst that reduces the amount of particulate matter emissions in the gaseous stream. Embodiments of the subject systems may also reduce the amount of particulate matter precursor emissions in the gaseous stream. In some cases, the subject systems and methods include a sorber that facilitates the reduction in particulate matter and particulate matter precursors in the gaseous stream. The subject methods and systems find use in a variety of applications where it is desired to reduce particulate matter emissions from a gaseous stream.

In some cases, the systems and methods reduce the amount of particulate matter, such as condensable hydrocarbons, in the gaseous stream. The systems and methods may also reduce the amount of particulate matter precursors, such as sulfur dioxide ($SO_2$) and sulfur trioxide ($SO_3$), in the gaseous stream.

The method includes the steps of contacting the gaseous stream with a catalyst, where particulate matter in the gaseous stream is reduced by 30% or more, and reporting that particulate matter in the gaseous stream has been reduced. Additional aspects of the subject systems that find use in the subject methods are described below in greater detail.

In some cases, the subject methods further include the step of adjusting the gas hourly space velocity of the gaseous stream as it flows through the emissions trap. The gas hourly space velocity may be adjusted based on the concentration of particulate matter and/or particulate matter precursors in the gaseous stream. For example, the gas hourly space velocity may be adjusted based on the concentration of sulfur oxides in the gaseous stream.

In certain embodiments, the subject methods further include confirming the amount that particulate matter in the gaseous stream has been reduced. The amount of particulate matter in the gaseous stream can be confirmed using various test protocols, such as but not limited to U.S. EPA method 5 (see 40 C.F.R. Part 60, Appendix A-3; available online at http://www.epa.gov/ttn/emc/promgate.html), U.S. EPA method 201A (see 40 C.F.R. Part 51, Appendix M; available online at http://www.epa.gov/ttn/emc/promgate.html), U.S. EPA method 202 (see 40 C.F.R. Part 51, Appendix M; available online at http://www.epa.gov/ttn/emc/promgate.html), and the like.

Embodiments also include systems that have a catalytic emissions trap. The emissions trap includes a catalyst and is configured such that the gaseous stream contacts the catalyst as the gaseous stream flows through the trap. Particulate matter in the gaseous stream may be reduced by 30% or more, such as 50% or more, including 70% or more, 80% or more, 90% or more, 95% or more, or 98% or more. In certain embodiments, the system further includes a particulate matter indicator for outputting a result to a user, where the result is the amount that particulate matter in the gaseous stream has been reduced.

The subject systems find use in reducing particulate matter and particulate matter precursors in a gaseous stream. In some cases, the particulate matter includes hydrocarbons. In these cases, the catalyst is configured to oxidize hydrocarbons. In some cases, the particulate matter includes $SO_3$ and $SO_2$. In these cases, the catalyst is configured to reduce $SO_3$ to $SO_2$. Aspects of the subject system also include systems, where ammonia or ammonia precursors are not added to the gaseous stream.

The system may be configured to reduce the emission of particulate matter where the particulate matter has an average diameter of 10 μm or less. In some cases, the system reduces the emission of particulate matter where the particulate matter has an average diameter of 2.5 μm or less. For example, the system may reduce the emission of particulate matter where the particulate matter has an average diameter of 1 μm or less.

In certain cases, the gaseous stream is a gaseous emissions stream from a combustion source, such as but not limited to a reciprocating internal combustion engine, an internal combustion turbine, a utility boiler, and industrial boiler, and the like.

Certain embodiments of the subject system include the catalyst, where the catalyst is a platinum-containing catalyst. The catalytic emissions trap may further include a sorber, where in some cases the sorber includes carbonates, such as but not limited to, $K_2CO_3$, $BaCO_3$, combinations of carbonates, and the like. The catalytic emissions trap may further include a washcoat, where in some cases the washcoat includes but is not limited to alumina, titania, and the like.

Before the present invention is described in greater detail, it is to be understood that this invention is not limited to the particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

In further describing the subject invention, embodiments of the subject methods are described first in greater detail, followed by a review of embodiments of systems in which the subject methods find use.

Methods

Provided are methods for reducing emissions of particulate matter from a gaseous stream. In certain instances, the methods may also reduce emissions of particulate matter precursors from the gaseous stream. Embodiments of the subject methods include contacting the gaseous stream with a catalyst. In some cases, the particulate matter in the gaseous stream is reduced by 30% or more, such as by 50% or more, including by 70% or more, 80% or more, 90% or more, 95% or more, or 98% or more. The amount of particulate matter precursors in the gaseous stream may also be reduced by 30% or more, such as by 50% or more, including by 70% or more, 80% or more, 90% or more, 95% or more, or 98% or more.

In addition, the methods include reporting that particulate matter in the gaseous stream has been reduced. In certain instances, the reporting includes providing an indication, such as an audio and/or visual signal, to a user that particulate matter in the gaseous stream has been reduced. The reporting may include displaying that particulate matter in the gaseous stream has been reduced. In some cases, the amount of particulate matter in the gaseous stream is displayed. Where desired, the amount of the reduction of particulate matter in the gaseous stream may be displayed.

In certain embodiments, the subject system includes a first catalytic emissions trap with a first catalyst and a second catalytic emissions trap with a second catalyst. The subject method may include contacting the gaseous stream with the first catalytic emissions trap and the second catalytic emissions trap. In addition, the second emissions trap may be positioned upstream from the first emissions trap. By "upstream" is meant positioned proximal to a source of a fluid flow, such as a gaseous stream. By "downstream" is meant positioned distal to the source of a fluid flow. Correspondingly, in some cases, the subject method includes contacting the gaseous stream with the second emissions trap followed by contacting the gaseous stream with the first emissions trap. In other embodiments, the first emissions trap is positioned upstream from the second emissions trap. Correspondingly, in these cases, the subject method includes contacting the gaseous stream with the first emissions trap followed by contacting the gaseous stream with the second emissions trap.

Additionally, certain embodiments of the subject systems include that the gas hourly space velocity for the emissions trap ranges from 200 per hour to 300,000 per hour, such as 200 per hour to 150,000 per hour, including 1,000 per hour to 100,000 per hour. In embodiments where the system includes a first emissions trap and a second emissions trap, the gas hourly space velocities of the traps can be substantially the same. In other cases, the gas hourly space velocities of the first and second emissions traps can be different. For example, the gas hourly space velocity of the first emissions trap may range from 200 per hour to 100,000 per hour, such as from 3,000 per hour to 50,000 per hour, including from 10,000 per hour to 35,000 per hour, for example from 20,000 per hour to 35,000 per hour. In some cases, the gas hourly space velocity of the second emissions trap ranges from 200 per hour to 300,000 per hour, such as from 1,000 per hour to 100,000 per hour, including from 10,000 per hour to 100,000 per hour, for example from 30,000 per hour to 90,000 per hour, or from 60,000 per hour to 90,000 per hour.

In certain embodiments, the method further includes the step of adjusting the gas hourly space velocity based on the amount of particulate matter in the gaseous stream. In some instances, the method further includes the step of adjusting the gas hourly space velocity based on the amount of particulate matter precursors in the gaseous stream. In some cases, the method includes the step of adjusting the gas hourly space velocity based on the amount of particulate matter and particulate matter precursors in the gaseous stream. If the concentration of particulate matter and/or particulate matter precursors in the gaseous stream increases by a certain amount (e.g. 0.001 grains per dry standard cubic foot (gr/dscf) or more), then method can include decreasing the gas hourly space velocity of the gaseous stream to facilitate more efficient reduction of the particulate matter and particulate matter precursors in the gaseous stream. Conversely, if the concentration of particulate matter and/or particulate matter precursors in the gaseous stream decreases by a certain amount (e.g. 0.001 gr/dscf or more), then the method can include increasing the gas hourly space velocity of the gaseous stream while still maintaining efficient reduction of the particulate matter and particulate matter precursors in the gaseous stream. In certain embodiments, a target value for the reduction in emissions for particulate matter and particulate matter precursors is desired. The method may include adjusting the gas hourly space velocity of the gaseous stream such that a target value for the reduction in emissions of particulate matter and particulate matter precursors is achieved.

In certain instances, the method includes adjusting the gas hourly space velocity of the gaseous stream based on the concentration of sulfur oxides in the gaseous stream. For example, if the amount of sulfur oxides in the gaseous stream increases, then the method can include decreasing the gas hourly space velocity of the gaseous stream. In some cases, decreasing the gas hourly space velocity of the gaseous stream facilitates maintaining the concentration of sulfur oxides in the gaseous stream at or below a desired target value. Alternatively, if the amount of sulfur oxides in the gaseous stream decreases, then the method can include increasing the gas hourly space velocity of the gaseous stream. Where desired, the gas hourly space velocity of the gaseous stream may be increased while still maintaining the concentration of sulfur oxides in the gaseous stream at or below a desired target value.

In certain embodiments, the method includes contacting the gaseous stream with the catalyst without adjusting the temperature of the gaseous stream from the source of the gaseous stream. In some embodiments, the method includes adjusting the temperature of the gaseous stream before contacting the gaseous stream with the catalyst. If the temperature of the gaseous stream upstream from the catalyst is greater than a desired temperature or temperature range, then the adjusting may include reducing the temperature of the gaseous stream to the desired temperature or temperature range. For example, reducing the temperature of the gaseous stream may include, but is not limited to, reducing the pressure of the gaseous stream, contacting the gaseous stream with a heat exchanger, and the like. If the temperature of the gaseous stream upstream from the catalyst is lower than the desired temperature or temperature range, then the adjusting may include increasing the temperature of the gaseous stream to the desired temperature or temperature range. For example, increasing the temperature of the gaseous stream may include, but is not limited to, increasing the pressure of the gaseous stream, contacting the gaseous stream with a heat exchanger, and the like. In some instances, the temperature of the gaseous stream may range from 50° C. to 550° C., such as from 150° C. to 500° C., including from 200° C. to 450° C., for example from 260° C. to 400° C. In certain instances, methods include adjusting the temperature of an initial gaseous stream so that the temperature falls within these ranges.

In further embodiments of the subject methods, the step of confirming the amount that particulate matter in the gaseous stream has been reduced includes testing the gaseous stream for the presence or absence of particulate matter and/or particulate matter precursors. In some instances, the confirming includes testing the gaseous stream using U.S. EPA method 5 (see 40 C.F.R. Part 60, Appendix A-3; available online at http://www.epa.gov/ttn/emc/promgate.html), which includes a sampling probe, a heated sampling line, a heated filter, and a series of impingers. In certain cases, the confirming includes testing the gaseous stream using U.S. EPA method 201A (see 40 C.F.R. Part 51, Appendix M; available online at http://www.epa.gov/ttn/emc/promgate.html), which includes an inertial separation device that reduces the amount of coarse particulate matter in the measurement. In some cases, the confirming includes testing the gaseous stream using U.S. EPA method 202 (see 40 C.F.R. Part 51, Appendix M; available online at http://www.epa.gov/ttn/emc/promgate.html), which may be configured to test for condensable inorganic compounds and condensable organic compounds.

In certain embodiments, the subject methods include measuring the amount of particulate matter in the gaseous stream in real-time. As used herein, the terms "measuring in real-time" and "real-time measurement" are interchangeable and refer to measuring a parameter as it occurs or immediately thereafter. In some cases, the subject methods and systems provide for continuous real-time measurement of the amount of particulate matter in the gaseous stream.

In certain embodiments, the method includes regenerating the catalytic emissions trap. Where desired, the regenerating includes regenerating the sorber. The regenerating may include contacting the sorber with a regeneration gaseous stream. In some cases, the sorber is substantially removed from the flow of the gaseous emissions stream before contacting the sorber with the regeneration gaseous stream. The sorber may be substantially removed from the flow of the gaseous emissions stream. By "substantially" is meant that 80% or more, 85% or more, 90% or more, such as 95% or more, including 98% or more, for example 99% or more of the flow of the gaseous emissions stream is prevented from contacting the emissions trap. Where desired, removing the catalytic emissions trap from the flow of the gaseous emissions stream includes removing the catalytic emissions trap from the conduit carrying the flow of the gaseous emissions stream. For example, the catalytic emissions trap may be removed from the conduit carrying the flow of the gaseous emissions stream by linearly translating (e.g., sliding, raising, lowering, etc.) or rotating (e.g., louvering, cantilevering, etc.) the catalytic emissions trap from the flow of the gaseous emissions stream.

In certain instances, removing the catalytic emissions trap from the flow of the gaseous emissions stream includes substantially isolating the catalytic emissions trap from the flow of the gaseous emissions stream. The isolating can be achieved, for example, by closing a first flow regulator positioned upstream from the catalytic emissions trap and closing a second flow regulator positioned downstream from the catalytic emissions trap. The flow regulators may include, but are not limited to, dampers, valves, and the like. In some cases, the flow regulators are dampers. Where desired, the method includes closing an upstream damper positioned upstream from the catalytic emissions trap and closing a downstream damper positioned downstream from the catalytic emissions trap. In certain instances, the flow of the regeneration gaseous stream is in the same direction as the flow of the gaseous emissions stream. Alternatively, the flow of the regeneration gaseous stream may be in the opposite direction from the flow of the gaseous emissions stream. The regeneration gaseous stream may have a flow rate less than the flow rate of the gaseous emissions stream. For example, the flow rate of the regeneration gaseous stream may be 25% or less of the flow rate of the gaseous emissions stream, such as 10% or less, including 5% or less, or 1% or less of the flow rate of the gaseous emissions stream.

In some cases, the regeneration gaseous stream includes a reducing gaseous stream. By "reducing gaseous stream" is meant that the gaseous stream provides a reducing atmosphere such that one or more compounds in contact with the reducing gaseous stream may be reduced. For example, as described below, the sorber may facilitate the sorbtion of particulate matter precursors, such as $NO_x$ from the gaseous emissions stream. In some cases, the sorber includes $K_2CO_3$ which may be converted to $KNO_2$ and $KNO_3$ as $NO_x$ is sorbed from the gaseous emissions stream. Regeneration of the sorber may include regenerating $K_2CO_3$ from $KNO_2$ and $KNO_3$. In certain instances, the regeneration of the sorber can occur according to the following reactions.

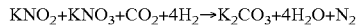

$KNO_2+KNO_3+CO_2+4H_2 \rightarrow K_2CO_3+4H_2O+N_2$

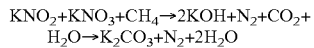

$KNO_2+KNO_3+CH_4 \rightarrow 2KOH+N_2+CO_2+H_2O \rightarrow K_2CO_3+N_2+2H_2O$

In certain embodiments, the regeneration gaseous stream includes hydrocarbons, such as, but not limited to, natural gas, syngas, methane, propane, diesel fuel, mixtures thereof, and the like. The hydrocarbons may include methane, $CH_4$. The regeneration gaseous stream may include from 0.5% to 25% $CH_4$, such as from 1% to 20% $CH_4$, including from 1% to 15% $CH_4$, or from 1% to 10% $CH_4$, for example from 1% to 5% $CH_4$. In some cases, the regeneration gaseous stream includes hydrogen. The regeneration gaseous stream may include from 1% to 10% $H_2$, such as from 1% to 5% $H_2$, including from 2% to 4% $H_2$. The regeneration gaseous stream may be mixed before contacting with the catalytic emissions trap. In some embodiments, a flow of hydrocarbons and a flow of steam is mixed to provide a regeneration gaseous stream prior to contacting the regeneration gaseous stream with the sorber.

In certain instances, the method includes reducing the concentration of sulfur in the flow of hydrocarbons before the mixing step. The concentration of sulfur in the flow of hydrocarbons may be reduced by contacting the flow of hydrocarbons with a sulfur trap, a sulfur scrubber, or the like. In some cases, the concentration of sulfur in the regeneration gaseous stream is 100 ppm or less, such as 50 ppm or less, including 30 ppm or less, for example 20 ppm or less, or 10 ppm or less.

In some instances, the method includes converting the hydrocarbons in the regeneration gaseous stream into $H_2$ before contacting the regeneration gaseous stream with the catalytic emissions trap. Converting the hydrocarbons into $H_2$ may include steam reforming of hydrocarbons into $H_2$. Steam reforming of hydrocarbons, such as $CH_4$, into $H_2$ can be carried out according to the following reactions.

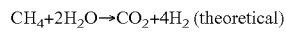

$CH_4+2H_2O \rightarrow CO_2+4H_2$ (theoretical)

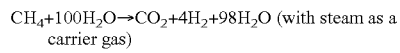

$CH_4+100H_2O \rightarrow CO_2+4H_2+98H_2O$ (with steam as a carrier gas)

The regeneration gaseous stream may further include water, such as steam. The steam may be superheated steam. For instance, the steam may have a temperature ranging from 150° C. to 600° C., such as from 250° C. to 550° C., including from 400° C. to 500° C. In some cases, the steam has a temperature of 450° C. The steam may have a pressure ranging from 50 kPa to 150 kPa, such as from 75 kPa to 125 kPa, including from 90 kPa to 110 kPa. In certain instances, the steam has a pressure of 100 kPa. In certain embodiments, the steam has a flow rate ranging from 500 lb/hr to 10,000 lb/hr, such as 750 lb/hr to 8,000 lb/hr, including 1,000 lb/hr to 7,000 lb/hr. The hydrocarbon flow rate can range from 50 standard cubic feet per hour (scfh) to 1,500 scfh, such as 100 scfh to 1,000 scfh, including 120 scfh to 800 scfh. In some cases, the ratio of the steam flow rate to the hydrocarbon flow rate ranges from 2:1 to 15:1, such as from 5:1 to 10:1, including from 7:1 to 9:1. Where desired, the ratio of the steam flow rate to the hydrocarbon flow rate is 8.5:1.

In some cases, the sorber is configured to sorb $SO_x$ from the gaseous emissions stream. In certain instances, $SO_2$ is oxidized to $SO_3$, which can be sorbed by the sorber. Sorbtion of $SO_2$ from the gaseous emissions stream may occur according to the following reaction to form a sorber-$SO_3$ complex.

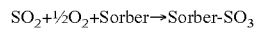

$SO_2+\frac{1}{2}O_2+Sorber \rightarrow Sorber-SO_3$

Regeneration of the sorber may include regenerating the sorber from the sorber-$SO_3$ complex. In certain instances, the regeneration of the sorber can occur according to the following reaction.

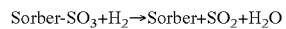

$Sorber-SO_3+H_2 \rightarrow Sorber+SO_2+H_2O$

Where desired, the regenerated $SO_2$ is removed from the regeneration gaseous stream by contacting the regeneration gaseous stream with a sulfur trap, sulfur scrubber, and the like. Removing $SO_2$ from the regeneration gaseous stream may facilitate more efficient removal of $SO_2$ from the gaseous stream because, in certain instances, the volume of regeneration gas used in less than the volume of gaseous emissions stream contacted with the emissions trap.

Systems

Also provided are systems for reducing emissions of particulate matter from a gaseous stream. Embodiments of the subject system include at least one emissions trap that includes a catalyst, i.e., a catalytic emissions trap. The catalytic emissions trap is configured such that the gaseous stream contacts the catalyst as the gaseous stream flows through the trap. In some cases, the catalytic emissions trap reduces particulate matter in the gaseous stream by 30% or more, such as by 50% or more, including by 70% or more, 80% or more, 90% or more, 95% or more, or 98% or more. The catalytic emissions trap may reduce particulate matter precursors in the gaseous stream by 30% or more, such as by 50% or more, including by 70% or more, 80% or more, 90% or more, 95% or more, or 98% or more.

In certain embodiments, the subject systems also include a particulate matter indicator. Where desired, the particulate matter indicators reports to a user the amount of particulate matter in the gaseous stream. In some cases, particulate matter indicators report to a user that particulate matter has been reduced. The particulate matter indicators may output a result to a user. The result may include the amount that particulate matter in the gaseous stream has been reduced.

Embodiments of the subject system provide for capturing and reducing the amount of various particulate matter in a gaseous stream. In certain embodiments, the subject systems provide for reducing particulate matter and particulate matter precursors in a gaseous stream. The system may be configured to reduce the amount of particulate matter, where the particulate matter has an average diameter of 10 μm or less. In some cases, the system is configured to reduce the amount of particulate matter, where the particulate matter has an average diameter of 2.5 μm or less. In addition, the system may be configured to reduce the amount of particulate matter, where the particulate matter has an average diameter of 1 μm or less.

In certain embodiments, the subject system includes a source of a gaseous stream. In addition, the system may include a conduit configured to carry a flow of the gaseous stream. The gaseous stream may include particulate matter. In some cases, the gaseous stream is an emissions stream from a combustion source, such as, but not limited to, an engine, a combustion engine, a reciprocating internal combustion engine, an internal combustion turbine, a utility boiler, an industrial boiler, and the like. In some cases, the gaseous stream is a combustion gas stream that includes particulate matter, such as, but not limited to, hydrocarbons (e.g. condensable hydrocarbons), and particulate matter precursors, such as, but not limited to, sulfur oxides, for example sulfur trioxide ($SO_3$), sulfur dioxide ($SO_2$), and the like.

As indicated above, the combustion source may be a turbine. In certain embodiments, the subject system is configured such that the gaseous emission stream from the turbine has a pressure drop of 15 inches of $H_2O$ or less, such as 10 inches of $H_2O$ or less, including 5 inches of $H_2O$ or less, for example 3 inches of $H_2O$ or less as the gaseous stream flows through the emissions trap. In other embodiments, the subject system is configured such that the gaseous emission stream from the internal combustion engine has a pressure drop of 100 psi or less, such as 50 psi or less, including 25 psi or less, for example 10 psi or less, including 5 psi or less as the gaseous stream flows through the emissions trap.

In certain embodiments, the system includes a catalytic emissions trap positioned in the conduit carrying the gaseous stream. In certain instances, the gaseous stream flows through the system including the emissions trap where the gaseous stream contacts the catalyst. In some cases, the emissions trap is configured to accommodate a gas hourly space velocity ranging from 200 per hour to 300,000 per hour, such as 200 per hour to 150,000 per hour, including 1,000 per hour to 100,000 per hour. For example, the emissions trap may be configured to accommodate a gas hourly space velocity ranging from 200 per hour to 100,000 per hour, such as from 3,000 per hour to 50,000 per hour, including from 10,000 per hour to 35,000 per hour, for example from 20,000 per hour to 35,000 per hour. In some cases, the emissions trap is configured to accommodate a gas hourly space velocity ranging from 200 per hour to 300,000 per hour, such as 1,000 per hour to 100,000 per hour, including from 10,000 per hour to 100,000 per hour, for example from 30,000 per hour to 90,000 per hour, or from 60,000 per hour to 90,000 per hour.

In certain embodiments, the system includes a controller. The controller may be configured to control the gas hourly space velocity of the gaseous stream. Where desired, the controller is configured to adjust the gas hourly space velocity of the gaseous stream depending on the particulate matter and/or particulate matter precursor composition of the gaseous stream. For example, if the concentration of particulate matter and/or particulate matter precursors in the gaseous stream increases by a certain amount (e.g. 0.001 gr/dscf or more), then the controller can reduce the gas hourly space velocity of the gaseous stream. In some cases, reducing the gas hourly space velocity of the gaseous stream facilitates more efficient reduction of the particulate matter and particulate matter precursors in the gaseous stream. Conversely, if the concentration of particulate matter and/or particulate matter precursors in the gaseous stream decreases by a certain amount (e.g. 0.001 gr/dscf or more), then the controller can increase the gas hourly space velocity of the gaseous stream. In some cases, the gas hourly space velocity of the gaseous stream is increased while the emissions trap still maintains efficient reduction of the particulate matter and particulate matter precursors in the gaseous stream.

In certain embodiments, the controller is configured to control the regeneration of the catalytic emissions traps. The controller may receive inputs from sensors positioned downstream from the emissions traps. The sensors may be configured to detect the concentration of one or more emissions in a gaseous stream, such as, but not limited to, particulate matter, particulate matter precursors, $NO_x$, $SO_x$, hydrocarbons, and the like. In some cases, the system includes two or more emissions traps arranged in parallel. Each emissions trap may have a sensor positioned downstream from the emissions trap, such that the concentration of one or more emissions in the gaseous stream can be detected downstream from each emissions trap independently from the other emissions traps. Where desired, the controller is configured to compare the concentration of one or more emissions in the gaseous stream with a threshold value. In some instances, if the concentration of one or more emissions in the gaseous stream is greater than the threshold value, then the controller initiates regeneration of the emissions trap that has emissions exceeding the threshold value. Alternatively, the controller may be configured to regenerate the emissions trap after the emissions trap has been contacted with the gaseous emissions stream for a desired amount of time.

Catalytic emissions traps of the subject systems include a catalyst. In some embodiments, the catalyst is applied to a substrate. The emissions trap may further include a sorber that is also applied to the substrate. In certain embodiments, the catalyst and sorber are uniformly distributed on the substrate. In some cases, the emissions trap further includes a washcoat which is also applied to the substrate. The washcoat may be applied to the substrate first, followed by the catalyst and sorber, if present. In other cases, the washcoat and the catalyst are combined first and then applied to the substrate, followed by the sorber, if present.

In certain embodiments, the subject systems include one or more catalytic emissions traps. The traps may be arranged in series or in parallel. For instance, the system may include a first emissions trap that includes a first catalyst and a second emissions trap that includes a second catalyst. In some cases, the first emissions trap and the second emissions trap are arranged in series. The first emissions trap may be positioned upstream of the second emissions trap. In other embodiments, the second emissions trap is positioned upstream of the first emissions trap. The gaseous stream flows through the upstream emissions trap first, and then flows through any downstream emissions traps. In some cases, the gaseous stream contacts the catalyst in the upstream emissions trap first, and then contacts the catalyst in the downstream emissions trap second.

In certain embodiments, the catalytic emissions traps are arranged in series and in parallel, such that the gaseous stream flows through two or more parallel rows of emissions traps, where each row includes one or more emissions traps in series. In some cases, the one or more traps all include the same composition of the catalyst, sorber and washcoat. In other cases, the one or more traps include different compositions of catalyst, sorber and washcoat. For example, a first trap and a second trap may be arranged in series, where the first trap includes a first composition of catalyst, sorber and washcoat, and the second trap includes the same composition of catalyst, sorber and washcoat. In other examples, the first trap and the second trap may be arranged in series, where the first trap includes a first composition of catalyst, sorber and washcoat, and the second trap includes a different composition of catalyst, sorber and washcoat. Embodiments of catalysts, sorbers and washcoats are described in more detail below.

In certain embodiments, the system is configured to provide for regeneration of the catalytic emissions trap. For example, the system may be configured to provide for regeneration of the sorber. As described above, the catalytic emissions trap may be substantially removed from the flow of the gaseous emissions stream. Where desired, the catalytic emissions trap may be removed from the flow of the gaseous emissions stream by removing the catalytic emissions trap from the conduit carrying the flow of the gaseous emissions stream. In some cases, the catalytic emissions trap may be substantially isolated from the flow of the gaseous emissions stream. Stated another way, the system may include an isolatable catalytic emissions trap. Embodiments of the isolatable catalytic emissions trap may be configured such that substantially none of the gaseous emissions stream contacts the catalytic emissions trap. Instead, the isolatable catalytic emissions trap may be configured such that the regeneration gaseous stream contacts the sorber as the regeneration gaseous stream flows through the catalytic emissions trap.

In certain embodiments, the isolatable catalytic emissions trap includes one or more flow regulators configured to substantially isolate the isolatable catalytic emissions trap from the flow of the gaseous emissions stream. Where desired, the isolatable catalytic emissions trap includes a first flow regulator positioned upstream from the catalyst and sorber of the catalytic emissions trap and a second flow regulator positioned downstream from the catalyst and sorber of the catalytic emissions trap. The flow regulators may include, but are not limited to, dampers, valves, and the like. In some cases, the flow regulators are dampers. Embodiments of the system may include one or more dampers configured to substantially isolate the catalytic emissions trap from the flow of the gaseous emissions stream. For example, the system may include an upstream damper positioned upstream from the catalytic emissions trap and configured to substantially seal the emissions trap from the flow of the gaseous emissions stream when in a closed position. In addition, the system may include a downstream damper positioned downstream from the catalytic emissions trap and configured to substantially seal the emissions trap from the flow of the gaseous emissions stream when in a closed position.

When the upstream and downstream dampers are in the closed position, the catalytic emissions trap may be substantially sealed from the flow of the gaseous emissions stream. The sorber can be contacted with the regeneration gaseous stream after the catalytic emissions trap is substantially isolated from the flow of the gaseous emissions stream. As described above, the system may include two or more parallel rows of emissions traps, where each row includes one or more emissions traps in series. Each of the parallel rows of emissions traps may be positioned in its own conduit. In some instances, the systems include upstream and downstream dampers for each of the two or more parallel rows of emissions traps. The upstream and downstream dampers for each row of emissions traps may be controlled independently. Where desired, each row of emissions traps is substantially isolated from the flow of the gaseous emissions stream independently from the other rows of emissions traps. In some cases, the system is configured to regenerate each row of emissions traps independently from the other rows of emissions traps. The flow of the gaseous emissions stream can be maintained through the emissions traps that are not being contacted with the regeneration gaseous stream.

In certain embodiments, the dampers include one or more damper blades. The damper blades may be configured to rotate about an axis such that the damper blades may be moved from an open position to a closed position, and vice versa. For instance, the damper may be configured as a single-blade damper, a butterfly damper, a multi-blade damper, and the like. In the open position, the cross-sectional area of the damper blades may be substantially minimized with respect to the flow of the gaseous stream. Alternatively, in the closed position, the cross-sectional area of the damper blades may be substantially maximized with respect to the gaseous stream. When the damper blades are in the closed position, the damper blades may substantially seal the emissions trap from the flow of the gaseous emissions stream.

In some instances, the damper blades are configured to resist deformation during use. For example, the damper blades may be configured to resist deformation over extended periods of use, such as several weeks, several months, and several years without substantial deformation. In some cases, damper blades that resist deformation facilitate maintaining a tight seal even after many cycles of opening and closing the dampers over extended periods of use. The damper blades may be configured as planar damper blades, or the damper blades may be configured to have a cross-section in the shape of a triangle, a square, a rectangle, a trapezoid, and the like. The damper blades may be exposed to harsh conditions, such as high temperature, corrosive gases, corrosive liquids, and the like, without substantial structural degradation, decomposition, or corrosion. In certain instances, the damper blades are made of stainless steel, and the like.

In some embodiments, the system includes an actuator operatively connected to the damper. The actuator can be powered in any convenient manner. For example, the actuator can be a pneumatic actuator, a hydraulic actuator, an electric actuator, and the like. The actuator can be configured to move the damper in a manner as described in detail above.

Where desired, the system includes one or more seals. The seals may be configured to substantially seal an isolatable catalytic emissions trap from the flow of a gaseous emissions stream. In certain embodiments, the seal is positioned on the flow regulator and configured to substantially seal the flow regulator from the flow of the gaseous emissions stream. In some instances the seal is positioned on a damper, such as around the perimeter of the damper. The seal may be positioned on the side walls of the conduit where the damper contacts the side walls of the conduit when the damper is in the closed position. In some cases, the seal facilitates maintaining a substantially tight seal around the damper such that the catalytic emissions trap is substantially sealed from the flow of the gaseous emissions stream when the damper is in the closed position. Stated another way, the seal may facilitate having substantially no leakage of the gaseous stream through the damper when the damper is in the closed position. Where desired, the seal is a flexible seal. In some cases, a flexible seal facilitates maintaining a substantially tight seal. Seals useful for the subject systems can be exposed to harsh conditions, such as high temperature, corrosive gases, corrosive liquids, and the like, without substantial structural degradation, decomposition, or corrosion. Embodiments of the seal include metal seals, such as, but not limited to, an Inconel® metal seal (Huntington, W.Va.).

In certain embodiments, the system includes a source of a regeneration gaseous stream. As described above, the regeneration gaseous stream can include hydrocarbons and steam. In some instances, the source of the regeneration gaseous stream includes a hydrocarbon reformer. The hydrocarbon reformer may be configured to perform steam reforming of hydrocarbons into $H_2$. In some cases, the hydrocarbons can include $CH_4$, as described above. The hydrocarbon reformer may be configured to accommodate a temperature ranging from 150° C. to 600° C., such as from 250° C. to 550° C., including from 400° C. to 500° C. The hydrocarbon reformer may be configured to accommodate a pressure ranging from 50 kPa to 150 kPa, such as from 75 kPa to 125 kPa, including from 90 kPa to 110 kPa.

The subject systems may further include one or more blowers. The blowers may facilitate the movement of a gaseous stream through the system. In certain embodiments, the blowers facilitate the movement of a regeneration gaseous stream through the system. The blower may be positioned upstream from the emissions traps. The blower may be configured to push the regeneration gaseous stream through the system. For instance, the blower may be configured to push the regeneration gaseous stream downstream through the system. In certain embodiments, the subject systems include one or more exhausters. The exhausters may facilitate the movement of a gaseous stream through the system. In certain cases, the exhausters facilitate movement of a regeneration gaseous stream through the system. The exhauster may be positioned downstream from the emissions traps. The exhauster may be configured to pull a gaseous stream through the system. For example, the exhauster may be configured to pull the regeneration gaseous stream downstream through the system. In certain embodiments, the system includes a "push-pull" gas distribution system. The push-pull gas distribution system may include a blower positioned upstream from the catalytic emissions trap and an exhauster positioned downstream from the catalytic emissions trap. In some cases, the push-pull gas distribution system facilitates the movement of a gaseous stream through the system. For instance, the push-pull gas distribution system may facilitate the movement of the regeneration gaseous stream through the system. The push-pull gas distribution system may also facilitate an even distribution of the gaseous stream across the catalytic emissions traps. In some case, the push-pull gas distribution system facilitates the even distribution of the regeneration gaseous stream across the catalytic emissions traps.

Where desired, the push-pull gas distribution system is configured to move the regeneration gaseous stream through the system in a direction opposite the gaseous emissions stream. For example, the system may be configured to provide a flow of a gaseous emissions stream in a direction from upstream (i.e., proximal to the source of the gaseous emissions stream) to downstream (i.e., distal to the source of the gaseous emissions stream) with respect to the source of the gaseous emissions stream. The system may be configured to provide a flow of a regeneration gaseous stream in a direction from downstream to upstream with respect to the source of the gaseous emissions stream. Stated another way, the system may be configured to provide a flow of a regeneration gaseous stream in a direction from upstream (i.e., proximal to the source of the regeneration gaseous stream) to downstream (i.e., distal to the source of the regeneration gaseous stream) with respect to the source of the regeneration gaseous stream.

An embodiment of the subject system is shown in FIG. 1. The system includes catalytic emissions traps 110 arranged in parallel. A gaseous emissions stream 120 flows from an outlet 130 from a combustion source through a first duct 140. The gaseous emissions stream contacts first heat exchanger 150. Where desired, first heat exchanger 150 is configured to transfer heat from gaseous emissions stream 120 to steam from a first boiler 170. After contacting first heat exchanger 150, gaseous emissions stream 120 passes through second duct 160. Gaseous emissions stream 120 then contacts first boiler 170. In certain embodiments, first boiler 170 is configured to transfer heat from gaseous emissions stream 120 to a fluid, such as water. Gaseous emissions stream 120 then contacts catalytic emissions traps 110. The system may further include a second heat exchanger 190 positioned downstream from the catalytic emissions traps 110. Second heat exchanger 190 may be configured to transfer heat from the gaseous stream downstream from catalytic emissions traps 110 to a fluid, such as water. Where desired, the second heat exchanger 190 is configured to pre-heat the fluid, such as water, used in first boiler 170. The gaseous stream then flows out of the system or, where desired, to subsequent downstream emissions control systems.

Figure 2:
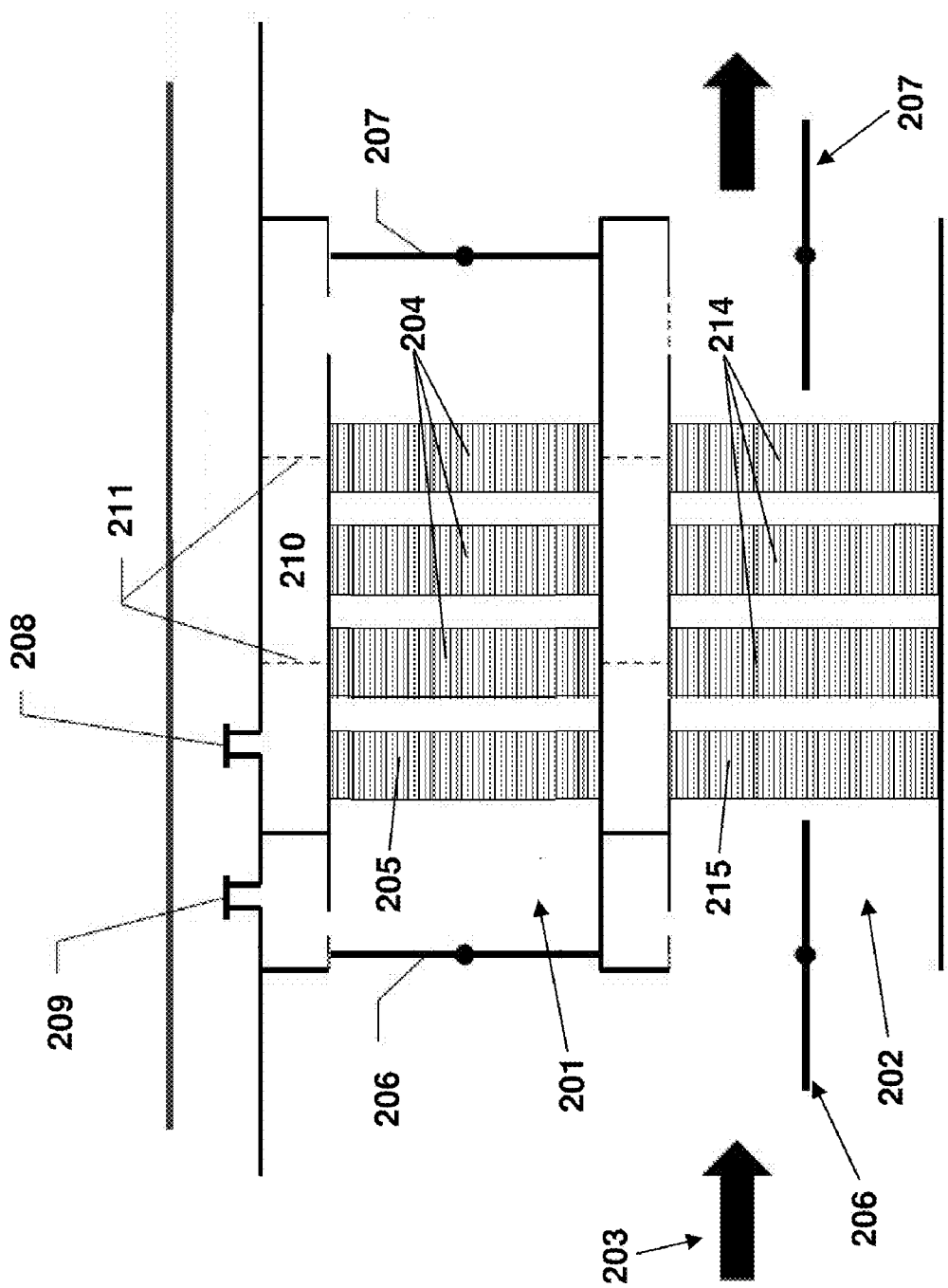
FIG. 2 shows a drawing of an embodiment of a subject system for reducing emissions of particulate matter from a gaseous stream.

An embodiment of the subject system for reducing particulate matter in a gaseous emissions stream is shown in FIG. 2. As shown in FIG. 2, the system includes two parallel rows of emissions traps positioned in conduits 201 and 202, respectively. The emissions traps may be contacted with an gaseous emissions stream 203. Conduits 201 and 202 may each include four emissions traps in series. In some embodiments, the three downstream emissions traps 204 in conduit 201 include a first catalyst and the upstream emissions trap 205 in conduit 201 includes a second catalyst. The compositions of the first catalyst and the second catalyst may be different. Similarly, the three downstream emissions traps 214 in conduit 202 may include a first catalyst and the upstream emissions trap 215 in conduit 202 may include a second catalyst. The system also includes inlet isolation dampers 206 and outlet isolation dampers 207. The inlet isolation damper and the outlet isolation damper of conduit 202 are both in an open position, which allows gaseous emissions stream 203 to contact emissions traps 215 and 214. The inlet isolation damper and the outlet isolation damper of conduit 201 are both in a closed position, which isolates emissions traps 204 and 205 from the flow of the gaseous emissions stream and allows emissions traps 204 and 205 to be contacted with a regeneration gaseous stream (see FIG. 3). Also shown in FIG. 2 is regeneration gas inlet 208 and regeneration gas outlet 209. The regeneration gaseous stream flows through regeneration gas inlet 208 into plenum 210, which includes flow distribution baffles 211. Plenum 210 and flow distribution baffles 211 facilitate even distribution of the regeneration gaseous stream across the emissions traps. The regeneration gaseous stream flows into conduit 201 from plenum 210, contacts emissions traps 204 and 205, and flows out of conduit 201 through regeneration gas outlet 209. Each conduit has its own inlet isolation damper, outlet isolation damper, and system for distributing the regeneration gaseous stream, which allows emissions traps 204 and 205 to be regenerated independently from emissions traps 214 and 215.

Figure 3:
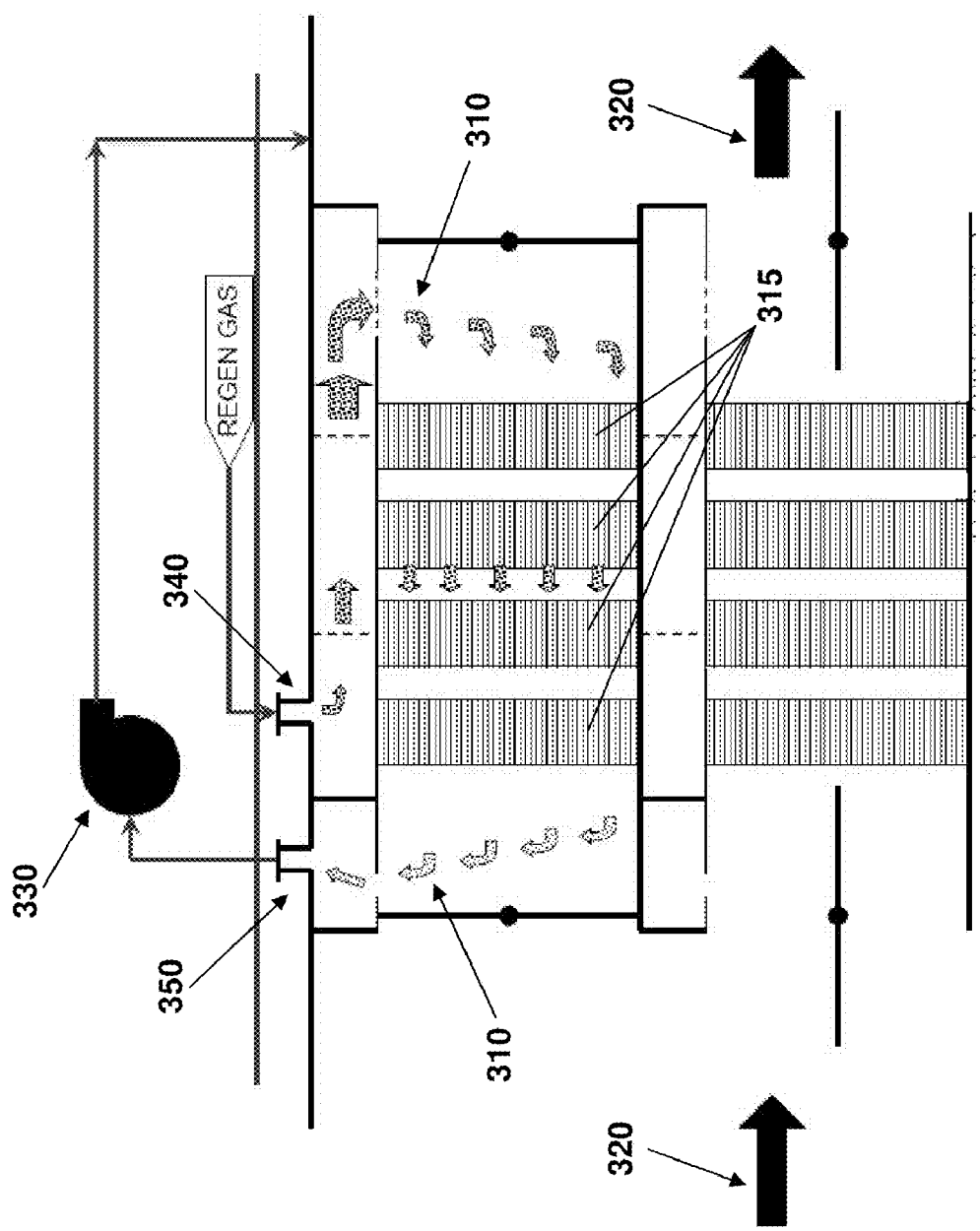
FIG. 3 shows a drawing of an embodiment of a subject system for reducing emissions of particulate matter from a gaseous stream. The flow of the regeneration gaseous stream is indicated.

FIG. 3 shows a schematic of an embodiment of the subject system for reducing particulate matter in a gaseous emissions stream. The flow path of the regeneration gaseous stream 310 is indicated. Regeneration gaseous stream 310 flows through the emissions traps 315 in an opposite direction from the flow of gaseous emissions stream 320. Also shown in FIG. 3 is exhauster 330 positioned downstream from regeneration gas outlet 350. Exhauster 330 is configured to pull the regeneration gaseous stream 310 through the emissions traps 315.

Upstream from regeneration gas inlet 340, the system may also include a blower (not pictured) configured to push the regeneration gaseous stream through the emissions traps 315. The system may include a push-pull gas distribution system for distributing the regeneration gaseous stream through the system. The regeneration gas distribution system may further include one or more valves (not pictured). In certain embodiments, the regeneration gas distribution system includes an inlet valve positioned proximal to the regeneration gas inlet. The regeneration gas distribution system may also include an outlet valve positioned proximal to the regeneration gas outlet. The valves may facilitate regulating the flow of the regeneration gaseous stream through the system. In certain embodiments, the valves are substantially leak resistant, such that substantially no leakage occurs when the valves are in a closed position. Where desired, the valves may have a seat leakage classification of Class V or Class VI, as defined by American National Standards Institute/Fluid Controls Institute, ANSI/FCI 70-2-2006.

In some cases, the system also includes a display for outputting data and/or results to a user in a human-readable format. In certain instances, the system also includes a communication link for communicating with other devices, such as, but not limited to, a wired communication link (e.g., a USB, serial, Ethernet, or parallel interface, and the like), or a wireless communication link (e.g., Bluetooth, 802.11, cellular, infrared, RF, and the like).

Conventional emissions control systems mix ammonia or ammonia precursors into the exhaust gas stream to control the amount of NO and $NO_2$ emissions. However, unreacted ammonia, also known as ammonia slip, can then react with sulfur also present in exhaust gas to produce particulate matter. Embodiments of the subject systems do not use ammonia or ammonia precursors. In certain embodiments, the systems facilitate a reduction in particulate matter and particulate matter precursors without contacting the gaseous stream with ammonia or ammonia precursors.

In certain embodiments, the subject systems include catalytic emissions traps such as but not limited to EMx, ESx, SCONOx, SrSCONOx, and SCOSOx (all commercially available from EmeraChem, Knoxville, Tenn.). In certain embodiments, the catalytic emissions traps are formulated as disclosed in the following U.S. Pat. Nos. 6,521,196; 6,479,022; 6,251,347; 6,037,307; 5,953,911; 5,762,885; 5,665,321; 5,650,127; 5,607,650; 5,599,758; and 5,451,558, the disclosures of which are hereby incorporated by reference.

Substrates

Substrates used in the subject systems can include various types of substrates which provide sufficient surface area and are compatible with the application of the catalyst, washcoat and sorber used in the system. In addition, substrates useful for the subject systems can be exposed to harsh conditions, such as high temperature, corrosive gases, corrosive liquids, and the like, without substantial structural degradation, decomposition, or corrosion. For example, the systems may be configured to accommodate a gaseous stream having a temperature from 50° C. to 550° C., such as from 150° C. to 500° C., including from 200° C. to 450° C., for example from 260° C. to 400° C. In certain embodiments, the substrate includes a metal, such as but not limited to stainless steel, titanium, and the like. In some instances, the substrate comprises an oxide, such as but not limited to oxides of Al, Si, Zr, Ca, Mg, Hf, Ti, combinations thereof, and the like. In some cases, the substrate includes a ceramic, such as but not limited to cordierite, mullite, and the like.

Embodiments of the subject systems include a substrate that has a porous structure. Where desired, the porous substrate may have a macroporous structure. In some embodiments, the substrate has 100 cells per square inch to 600 cells per square inch, such as 200 cells per square inch to 400 cells per square inch, including 200 cells per square inch to 300 cells per square inch. Where desired, the substrate may have 230 cells per square inch. In some instances, the substrate is configured to facilitate contact of the gaseous stream with the catalyst applied to the surface of the substrate. In certain embodiments, the substrate is configured to have a honeycomb structure.

Catalysts

In some embodiments, the catalyst in the emissions trap includes a metal, such as a precious metal. The metal may be a platinum group metal, such as platinum, palladium, rhodium, ruthenium, osmium, or iridium. In certain cases, the catalyst includes the metal in an amount ranging from 20 $g/ft^3$ to 100 $g/ft^3$, such as 20 $g/ft^3$ to 50 $g/ft^3$, including 30 $g/ft^3$ to 46 $g/ft^3$. Where desired, the catalyst includes platinum. In some cases, the catalyst includes platinum and one or more other platinum group metals, such as palladium, rhodium, or a combination of palladium and rhodium. In certain embodiments, the catalyst includes platinum and palladium, platinum and rhodium, palladium and rhodium, or platinum, palladium and rhodium. In some cases, the catalyst includes platinum and 50 weight % or less palladium, such as 40 weight or less palladium, including 25 weight % or less palladium, for example, 10 weight % or less palladium. Where desired, the catalyst includes platinum and 50 weight % or less rhodium, such as 40 weight % or less rhodium, including 25 weight % or less rhodium, for example, 10 weight % or less rhodium. In other instances, the catalyst includes platinum and 50 weight % or less palladium and rhodium, such as 40 weight % or less palladium and rhodium, including 25 weight % or less palladium and rhodium, for example, 10 weight % or less palladium and rhodium.

In certain embodiments, the catalyst is applied to a substrate. A washcoat may be applied to the substrate first, and then the catalyst is applied. In some instances, the catalyst is applied with or without drying the washcoat before applying the catalyst. In other instances, the catalyst and the washcoat are first combined and then applied to the substrate.

The emissions trap may be configured to reduce the amount of particulate matter, such as but not limited to hydrocarbons, in a combustion gas stream. In some cases, the catalyst may be an oxidation catalyst. Where desired, the catalyst is an oxidation catalyst that reduces the amount of hydrocarbons in the gaseous stream by oxidizing hydrocarbons in the gaseous stream. In some instances, the hydrocarbons are oxidized to $CO_2$. In certain cases, the oxidation catalyst is configured to oxidize $SO_2$ to $SO_3$. Where desired, the emissions trap is configured to reduce the amount of particulate matter precursors, such as but not limited to sulfur oxides, in the gaseous stream. In some cases, the catalyst may be a reduction catalyst. In certain embodiments, the catalyst is a reduction catalyst that reduces $SO_3$ to $SO_2$.

As discussed above, the subject system may include a first emissions trap and a second emissions trap. In certain embodiments, the metal loadings of the catalysts in the first emissions trap and the second emissions trap are substantially the same. As used herein, the terms "substantially the same" and "substantially similar" are used interchangeable and refer to two or more items or values that are identical or nearly identical, such as 95% or more identical, including 98% or more identical, or 99% or more identical. In other embodiments, the metal loading of the catalyst in the first emissions trap is not the same as the metal loading of the catalyst in the second emissions trap. For example, the upstream emissions trap (i.e., the emissions trap closest to the source of the gaseous stream and through which the gaseous stream flows first) can include a catalyst that reduces $SO_3$ to $SO_2$, as described above, and the downstream emissions trap (i.e., the emissions trap further from the source of the gaseous stream and through which the gaseous stream flows second) can include a catalyst that oxidizes hydrocarbons, as described above. In other embodiments, the first emissions trap includes a catalyst that oxidizes hydrocarbons, and the second emissions trap includes a catalyst that reduces $SO_3$ to $SO_2$.

In certain embodiments, the emissions trap further includes copper oxide. Where desired, the emissions trap includes copper oxide in an amount ranging from $0.001$ g/in$^3$ to $5$ g/in$^3$, such as $0.01$ g/in$^3$ to $1$ g/in$^3$, including $0.1$ g/in$^3$ to $0.5$ g/in$^3$. In certain instances, the emissions trap includes copper oxide in an amount of $0.2$ g/in$^3$.

Sorbers

The emissions traps of the subject systems optionally include a sorber. The sorber may facilitate the retention of particulate matter and particulate matter precursors in the system. In some cases, the particulate matter and particulate matter precursors sorbed by the sorber are desorbed. Desorption of the particulate matter and particulate matter precursors may facilitate contact of the particulate matter and particulate matter precursors with the catalyst. The sorber may be included in the emissions trap of the subject systems. The sorber may include an alkali metal, an alkaline earth metal, or combinations thereof. The sorber may be an alkali metal carbonate, an alkali metal bicarbonate, an alkaline earth metal carbonate, an alkaline earth metal bicarbonate, or combinations thereof. For example, the sorber may include $K_2CO_3$, $BaCO_3$, $Na_2CO_3$, $MgCO_3$, $CaCO_3$, combinations thereof, and the like. In some instances, the sorber includes $K_2CO_3$. In other instances, the sorber includes $BaCO_3$. Where desired, the sorber includes $K_2CO_3$ and $BaCO_3$.

In some cases, the sorber is applied to the substrate at substantially the same time as the catalyst and the washcoat. In other cases, the sorber is applied to the substrate after the catalyst and washcoat have been applied to the substrate. The emissions trap may include the sorber in an amount ranging from $0.1$ g/in$^3$ to $1$ g/in$^3$, such as from $0.1$ g/in$^3$ to $0.6$ g/in$^3$, including from $0.1$ g/in$^3$ to $0.4$ g/in$^3$, for example from $0.1$ g/in$^3$ to $0.2$ g/in$^3$. In some cases, the emissions trap includes $0.17$ g/in$^3$ $BaCO_3$ and $0.17$ g/in$^3$ $K_2CO_3$.

The sorber may react with the gaseous stream and may be converted to an oxide or hydroxide. In some case, 20 mole % or less, such as 15 mole % or less, including 10 mole % or less, for example, 5 mole % or less of the sorber is converted to an oxide or hydroxide. For example, the sorber may include $K_2CO_3$ and may facilitate sorbtion of particulate matter precursors. In some instances, the sorber can sorb $NO_x$ from the gaseous emissions stream. For example, NO may be oxidized to $NO_2$, which can be sorbed by the sorber. Sorbtion of $NO_x$ from the gaseous emissions stream may occur according to the following reactions.

$$NO + \tfrac{1}{2}O_2 \rightarrow NO_2$$

$$NO_2 + K_2CO_3 \rightarrow KNO_2 + KNO_3 + CO_2$$

In certain embodiments, sorbtion of $SO_2$ from the gaseous emissions stream occurs according to the following reaction. $SO_2$ may be oxidized to $SO_3$, which can be sorbed by the sorber.

$$SO_2 + \tfrac{1}{2}O_2 + \text{Sorber} \rightarrow \text{Sorber-}SO_3$$

Washcoats

In certain embodiments, the emissions traps of the subject system include a washcoat applied to the substrate. The washcoat may include a metal oxide, such as, but not limited to, aluminum oxide (e.g., alpha alumina, beta alumina, eta alumina, chi alumina, gamma alumina, delta alumina, theta alumina, and the like), titanium dioxide (e.g., titania anatase, titania brookite, titania rutile, and the like). In some cases, the washcoat is applied to the surface of the substrate before the catalyst is applied. Where desired, the washcoat is dried before the catalyst is applied, while in other cases the washcoat is not dried before the catalyst is applied. The washcoat and the catalyst may be applied to the substrate at substantially the same time. In some cases, the washcoat may be combined with the catalyst to form a mixture, and then the mixture is applied to the substrate. The mixture can be applied to the substrate using various techniques, such as but not limited to, applying a slurry, spraying, dipping, sol-gel techniques, and the like.

The emissions trap may include the washcoat in an amount ranging from $0.1$ g/in$^3$ to $5$ g/in$^3$, such as from $0.1$ g/in$^3$ to $3$ g/in$^3$, including from $0.5$ g/in$^3$ to $2$ g/in$^3$, for example from $1$ g/in$^3$ to $2$ g/in$^3$. In some cases, the emissions trap includes $1.6$ g/in$^3$ alumina. Where desired, the washcoat includes gamma alumina.

Other embodiments of the emissions trap may include the washcoat in an amount ranging from $0.1$ g/in$^3$ to $5$ g/in$^3$, such as from $1$ g/in$^3$ to $4$ g/in$^3$, including from $1$ g/in$^3$ to $3$ g/in$^3$, for example from $2$ g/in$^3$ to $2.5$ g/in$^3$. In certain embodiments, the washcoat comprises titania anatase.

As described above, the subject systems may include one or more emissions traps, such as a first emissions trap and a second emissions trap. In some cases, the first emissions trap and the second emissions trap can have the same washcoat. Alternatively, the first emissions trap and the second emissions trap may have different washcoats. The second emissions trap may be upstream from the second emissions trap. In these cases, the first emissions trap may include an alumina washcoat as described above, and the second emissions trap may include a titania washcoat as described above.

Utility

As can be seen, the systems and methods of the present disclosure find use in a variety of different applications where it is desirable to reduce the amount of particulate matter and particulate matter precursors in a gaseous stream. Any gaseous stream that contains particulate matter or particulate matter precursors can be processed by the subject systems and methods. For example, the subject systems and methods can be applied to gaseous emissions streams from power plants, including gas turbine power plants, cogeneration power plants, and the like. In some embodiments, systems and methods of the invention find use in reducing the particulate matter and particulate matter precursor emissions from a combustion source, such as but not limited to a combustion engine, such as a reciprocating internal combustion engine, a stationary internal combustion engine, an internal combustion turbine, an industrial boiler, a utility boiler, and the like. The subject systems and methods can be applied to a gaseous stream, such as the combustion gas emissions from these combustion sources to reduce particulate matter and particulate matter precursor emissions.

The subject systems and methods additionally find use in monitoring and controlling the amount of particulate matter and particulate matter precursor emissions. As discussed above, the subject methods include confirming the amount that particulate matter and particulate matter precursors in the gaseous stream has been reduced. Confirming the amount that particulate matter and particulate matter precursors have been reduced may facilitate monitoring the gaseous emissions from a combustion source. In addition, as discussed above, the subject methods may include adjusting the gas hourly space velocity of the gaseous stream depending on the concentration of particulate matter and particulate matter precursors in the gaseous stream. In some cases, adjusting the gas hourly space velocity of the gaseous stream facilitates controlling the amount of particulate matter and particulate matter precursors in the gaseous stream.

The subject systems and methods additionally find use in applications for reducing the amount of particulate matter and particulate matter precursors in gaseous streams where the pressure drop across the emissions trap is minimized. Stated another way, the subject systems and methods are suitable for use to reduce particulate matter and particulate matter precursors from a gaseous stream while not creating excessive backpressure in the incoming gaseous stream. For example, the subject systems and methods may find use in reducing particulate matter and particulate matter precursors from a combustion gas emissions stream from a turbine. Where desired, the subject system is configured such that the gaseous emission stream from the turbine has a pressure drop of 15 inches of $H_2O$ or less, such as 10 inches of $H_2O$ or less, including 5 inches of $H_2O$ or less, for example 3 inches of $H_2O$ or less as the gaseous stream flows through the emissions trap.

As can be appreciated from the disclosure provided above, the present disclosure has a wide variety of applications. Accordingly, the following examples are offered for illustration purposes and are not intended to be construed as a limitation on the invention in any way. Those of skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric.

EXAMPLES

Materials and Methods

In the following Examples, the system tested included a catalytic emissions trap that included a platinum oxidation catalyst over an alumina washcoat with a potassium carbonate sorbent.

Example 1

Particulate matter (PM) control on a 30 MW Natural Gas Fired Turbine was tested. In this test, South Coast Air Quality Management District method 5.2 was conducted in parallel on two GE LM2500 gas turbines fired on pipeline natural gas. Turbine No. 1 had no emissions control device while Turbine No. 2 was equipped with a lean $NO_x$ trap. Particulate matter emissions were reported as total particulate. Results are presented in Table 1 below.

TABLE 1

Comparison of particulate matter emissions from two identical gas turbines without and with a lean $NO_x$ trap installed. Emissions are reported in g/h.

|  | Turbine No. 1 | Turbine No. 2 | % Difference |
|---|---|---|---|
| Test No. 1 | 272 | 127 | −53% |
| Test No. 2 | 395 | 281 | −29% |

The two tests of Table 1 were conducted six months apart both so that the effects of climate could be observed and also so that the impact of aging of the lean $NO_x$ trap catalyst could be seen.

Example 2

PM control on a 5.5 MW Dual Fuel Gas Turbine was tested. Three series of tests were conducted on a 5.5 MW dual fuel gas turbine operated on natural gas. The turbine was equipped with a lean $NO_x$ trap catalyst preceded by a sulfur trap catalyst. In the first test, samples were collected before and after installation of catalyst in the catalyst unit using U.S. EPA method 201A and U.S. EPA method 202. The second and third tests were conducted about 12 months later. Table 2 shows the results of tests conducted with a fresh lean $NO_x$ trap catalyst installed.

TABLE 2

Particulate matter emissions measured with a fresh lean $NO_x$ trap by U.S. EPA methods 201A and 202. Emissions are reported in g/h.

|  | Empty Chamber | Catalyst Installed | % Difference |
|---|---|---|---|
| Suspended PM | 5.4 | 20.4 |  |
| Condensable Organic Fraction | 9.1 | 19.1 |  |
| Condensable Inorganic Fraction | 426.4 | 104.3 |  |
| Total Fine Particulate Matter | 440.9 | 143.8 | −67% |

Tables 3 and 4 show results of tests taken after the lean $NO_x$ catalyst had been in service for six months.

TABLE 3

Particulate matter emissions measured after the lean $NO_x$ trap had been in service for six months. Emissions are reported in g/h.

|  | Empty Chamber | Catalyst Installed | % Difference |
|---|---|---|---|
| Suspended PM | 5.4 | 133.8 |  |
| Condensable Organic Fraction | 9.1 | 28.6 |  |
| Condensable Inorganic Fraction | 426.4 | 49.9 |  |
| Total Fine Particulate Matter | 440.9 | 212.3 | −52% |

TABLE 4

Particulate matter emissions measured after the lean $NO_x$ trap had been in service for six months. Emissions are reported in g/h.

|  | Empty Chamber | Catalyst Installed | % Difference |
|---|---|---|---|
| Suspended PM | 5.4 | 85.7 |  |
| Condensable Organic Fraction | 9.1 | 7.3 |  |

TABLE 4-continued

Particulate matter emissions measured after the lean NO$_x$ trap had been in service for six months. Emissions are reported in g/h.

|  | Empty Chamber | Catalyst Installed | % Difference |
|---|---|---|---|
| Condensable Inorganic Fraction | 426.4 | 22.7 |  |
| Total Fine Particulate Matter | 440.9 | 115.7 | −74% |

Example 3

PM control on a 200 kW Kerosene Fired Gas Turbine was tested. Emissions were measured simultaneously in front of and behind a catalyst chamber containing a sulfur trap followed by a lean NO$_x$ trap catalyst. A second set of tests was conducted with uncoated catalyst substrate to determine whether the reduction in particulate matter was a result of physical scavenging. The test protocol followed was U.S. EPA method 201A which only measures suspended particulate matter. Results are shown in Table 5 below.

TABLE 5

Particulate matter emissions with and without an active lean NO$_x$ trap catalyst installed. Emissions are reported in g/h.

|  | Inlet | Outlet | % Difference |
|---|---|---|---|
| With Lean NO$_x$ Trap | 10.67 | 3.19 | −70% |
| With Blank Catalyst Substrate | 10.67 | 10.77 | — |

Example 4

PM control on a 43 MW Natural Gas Fired Turbine was tested. Two tests were conducted on a 43 MW natural gas fired turbine operating at about 50 percent load. The catalyst chamber contained a sulfur trap followed by a lean NO$_x$ trap catalyst. The test methods performed were U.S. EPA methods 201A and 202 for sample collection and South Coast Air Quality Management District method 5.2 for sample analysis. Test results are shown in Table 6.

TABLE 6

Particulate matter emissions measured in front of the lean NO$_x$ trap and at the stack of a 43 MW natural gas fired turbine. Emissions are reported in g/h.

|  | Inlet | Stack | % Difference |
|---|---|---|---|
| Test No. 1 | 1034.2 | 707.6 |  |
| Test No. 2 | 2041.2 | 621.4 |  |
| Average | 1537.7 | 664.5 | −57% |

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A method for reducing particulate matter in a gaseous stream, the method comprising:
   contacting the gaseous stream with a catalytic emissions trap comprising a catalyst, wherein particulate matter in the gaseous stream is reduced by 30% or more; and
   reporting that particulate matter has been reduced.

2. The method of claim 1, wherein the method comprises contacting the gaseous stream with a first catalytic emissions trap comprising a first catalyst and a second catalytic emissions trap comprising a second catalyst.

3. The method of claim 2, wherein the second catalytic emissions trap is positioned upstream from the first catalytic emissions trap.

4. The method of claim 1, wherein the particulate matter comprises particulate matter and particulate matter precursors.

5. The method of claim 4, wherein the particulate matter comprises hydrocarbons.

6. The method of claim 5, wherein the catalyst is configured to oxidize hydrocarbons.

7. The method of claim 4, wherein the particulate matter comprises SO$_2$ and SO$_3$.

8. The method of claim 7, wherein the catalyst is configured to reduce SO$_3$ to SO$_2$.

9. The method of claim 1, wherein the gaseous stream is a gaseous emissions stream from a combustion source.

10. The method of claim 1, wherein the catalyst comprises a metal.

11. The method of claim 10, wherein the catalyst comprises the metal in an amount ranging from 20 g/ft$^3$ to 100 g/ft$^3$.

12. The method of claim 10, wherein the metal comprises platinum.

13. The method of claim 10, wherein the metal comprises platinum and 50 weight % or less palladium.

14. The method of claim 10, wherein the metal comprises platinum and 50 weight % or less rhodium.

15. The method of claim 10, wherein the metal comprises platinum and 50 weight % or less palladium and rhodium.

16. The method of claim 1, wherein the catalytic emissions trap further comprises a sorber.

17. The method of claim 16, wherein the sorber comprises an alkali metal carbonate, alkali metal bicarbonate, alkaline earth metal carbonate, alkaline earth metal bicarbonate, or combinations thereof.

18. The method of claim 17, wherein the sorber comprises K$_2$CO$_3$.

19. The method of claim 17, wherein the sorber comprises BaCO$_3$.

20. The method of claim 17, wherein the sorber comprises $K_2CO_3$ and $BaCO_3$.

21. The method of claim 1, wherein the catalytic emissions trap further comprises a washcoat.

22. The method of claim 21, wherein the catalytic emissions trap comprises an alumina washcoat.

23. The method of claim 22, wherein the catalytic emissions trap comprises the alumina washcoat in an amount ranging from 0.1 $g/in^3$ to 3 $g/in^3$.

24. The method of claim 2, wherein the second catalyst comprises a metal.

25. The method of claim 24, wherein the second catalyst comprises the metal in an amount ranging from 20 $g/ft^3$ to 100 $g/ft^3$.

26. The method of claim 24, wherein the metal comprises platinum.

27. The method of claim 24, wherein the metal comprises platinum and 50 weight % or less palladium.

28. The method of claim 24, wherein the metal comprises platinum and 50 weight % or less rhodium.

29. The method of claim 24, wherein the metal comprises platinum and 50 weight % or less palladium and rhodium.

30. The method of claim 24, wherein the second catalytic emissions trap further comprises a washcoat.

31. The method of claim 30, wherein the second catalytic emissions trap comprises a titania washcoat.

32. The method of claim 31, wherein the second catalytic emissions trap comprises the titania washcoat in an amount ranging from 1 $g/in^3$ to 4 $g/in^3$.

33. The method of claim 2, wherein the second catalytic emissions trap further comprises copper oxide.

34. The method of claim 33, wherein the second catalytic emissions trap comprises copper oxide in an amount ranging from 0.1 $g/in^3$ to 0.5 $g/in^3$.

35. The method of claim 1, wherein ammonia or ammonia precursors are not added to the gaseous stream.

36. The method of claim 2, wherein the method comprises contacting the gaseous stream with the first catalytic emissions trap at a gas hourly space velocity ranging from 200 per hour to 300,000 per hour.

37. The method of claim 36, further comprising adjusting the gas hourly space velocity of the gaseous stream based on the amount of particulate matter in the gaseous stream.

38. The method of claim 1, further comprising confirming the amount that particulate matter in the gaseous stream has been reduced.

39. The method of claim 1, further comprising regenerating the catalytic emissions trap.

40. The method of claim 39, wherein the regenerating comprises contacting the catalytic emissions trap with a regeneration gaseous stream.

41. A system for reducing particulate matter in a gaseous stream, the system comprising:
a source of a gaseous stream comprising particulate matter;
a catalytic emissions trap comprising a catalyst, wherein the catalytic emissions trap is configured such that the gaseous stream contacts the catalyst as the gaseous stream flows through the catalytic emissions trap, wherein particulate matter in the gaseous stream is reduced by 30% or more; and
a particulate matter indicator for outputting a result to a user, wherein the result is the amount that particulate matter in the gaseous stream has been reduced.

42. The system of claim 41, wherein the system comprises a first catalytic emissions trap comprising a first catalyst and a second catalytic emissions trap comprising a second catalyst.

43. The system of claim 42, wherein the second catalytic emissions trap is positioned upstream from the first catalytic emissions trap.

44. The system of claim 41, wherein the particulate matter comprises particulate matter and particulate matter precursors.

45. The system of claim 44, wherein the particulate matter comprises hydrocarbons.

46. The system of claim 45, wherein the system is configured to oxidize hydrocarbons.

47. The system of claim 44, wherein the particulate matter comprises $SO_2$ and $SO_3$.

48. The system of claim 47, wherein the system is configured to reduce $SO_3$ to $SO_2$.

49. The system of claim 41, wherein the source of the gaseous stream is a combustion source.

50. The system of claim 41, further comprising a controller configured to control the gas hourly space velocity of the gaseous stream.

51. The system of claim 50, wherein the controller is configured to adjust the gas hourly space velocity of the gaseous stream based on the amount of particulate matter in the gaseous stream.

52. The system of claim 41, wherein the catalytic emissions trap comprises an isolatable catalytic emissions trap.

53. The system of claim 52, wherein the isolatable catalytic emissions trap comprises a first flow regulator positioned upstream from the catalyst and a second flow regulator positioned downstream from the catalyst.

54. The system of claim 53, wherein the first flow regulator comprises a first damper and the second flow regulator comprises a second damper, wherein the first damper and the second damper are configured to isolate the isolatable catalytic emissions trap from a flow of the gaseous stream.

55. The system of claim 52, further comprising a seal configured to substantially seal the isolatable catalytic emissions trap from a flow of the gaseous stream.

56. The system of claim 52, further comprising a regeneration gaseous stream source.

57. The system of claim 56, wherein the regeneration gaseous stream source comprises a hydrocarbon reformer.

58. The system of claim 56, further comprising a push-pull gas distribution system configured to move the regeneration gaseous stream from the regeneration gaseous stream source through the isolatable catalytic emissions trap.

59. A system for regenerating a catalytic emissions trap, the system comprising:
a regeneration gaseous stream source;
an isolatable catalytic emissions trap comprising a catalyst and a sorber; and
a push-pull gas distribution system configured to move a regeneration gaseous stream from the regeneration gaseous stream source through the isolatable catalytic emissions trap.

60. The system of claim 59, wherein the regeneration gaseous stream source comprises a hydrocarbon reformer.

61. The system of claim 59, wherein the isolatable catalytic emissions trap comprises:
a first flow regulator positioned upstream from the catalyst and the sorber; and
a second flow regulator positioned downstream from the catalyst and the sorber.

62. The system of claim 61, wherein the first flow regulator comprises a first damper and the second flow regulator comprises a second damper, wherein the first damper and the second damper are configured to isolate the isolatable catalytic emissions trap from a flow of a gaseous emissions stream.

63. The system of claim 62, further comprising a seal configured to substantially seal the isolatable catalytic emissions trap from the flow of the gaseous emissions stream.

64. The system of claim 59, wherein the push-pull gas distribution system is configured to move the regeneration gaseous stream through the isolatable catalytic emissions trap in a direction opposite a flow of a gaseous emissions stream.

65. The system of claim 59, wherein the push-pull gas distribution system comprises:
- a blower positioned upstream from the isolatable catalytic emissions trap; and
- an exhauster positioned downstream from the isolatable catalytic emissions trap.

* * * * *